United States Patent [19]
Kilian

[11] 3,839,120
[45] Oct. 1, 1974

[54] MOLD FOR REPRODUCING SURFACE TEXTURE AND METHOD FOR MAKING THE SAME

[75] Inventor: Paul E. Kilian, Tustin City, Calif.

[73] Assignee: Konel Molded Products Corporation, Muskegon, Mich.

[22] Filed: Apr. 28, 1972

[21] Appl. No.: 248,741

Related U.S. Application Data

[60] Division of Ser. No. 117,706, Feb. 22, 1971, abandoned, which is a continuation of Ser. No. 782,189, Dec. 9, 1968, abandoned.

[52] U.S. Cl............... 156/245, 156/152, 156/242, 264/220
[51] Int. Cl............................................. B29b 3/00
[58] Field of Search ........... 156/152, 242, 243, 245, 156/332, 288, 289; 264/219, 220, 224, 225; 161/231, 233

[56] References Cited
UNITED STATES PATENTS

| | | | |
|---|---|---|---|
| 3,161,919 | 12/1964 | Renaud | 117/230 X |
| 3,215,763 | 11/1965 | Buerges | 264/220 |
| 3,420,733 | 1/1969 | Ochi et al. | 156/245 |
| 3,427,689 | 2/1969 | Windecker | 156/245 |

Primary Examiner—Charles E. Van Horn
Assistant Examiner—Caleb Weston
Attorney, Agent, or Firm—Price, Heneveld, Huizenga & Cooper

[57] ABSTRACT

This disclosure relates to a mold for use in accurate reproduction of articles having natural material surfaces and for a method of making the molds to achieve dimensional stability and accurate surface reproduction of the parts. The mold has a thin skin of uniform thickness with a surface forming the interior mold cavity and a reinforcing base secured to the thin skin which preferably contains heat conducting metal powders.

The mold is made by forming the thin skin of a cured resin of uniform thickness on the part to be reproduced such that the skin forms a negative of the part's shape and surface. A separable temporary layer, preferably of an elastomer such as silicone rubber, is formed on the outer surface of the thin skin. A reinforcing base of a curable resin is deposited on the temporary layer and partially cured to form a solid, self-supporting mass. The reinforcing base, temporary layer and the thin skin are separated. The reinforcing base is then cured to a rigid solid mass and recombined with the skin through an adhesive material which is of similar composition as the reinforcing base and the thin skin. The final curing of the reinforcing base separate from the skin permits shrinkage of the reinforcing base during the curing without affecting the dimensions of the thin skin. The thickness of the separable layer gives the reinforcing base a tolerance for shrinkage so that the base can still adequately reinforce the thin skin after curing of the base.

3 Claims, 3 Drawing Figures

PATENTED OCT 1 1974            3,839,120

INVENTOR.
PAUL E. KILIAN
BY
ATTORNEYS

MOLD FOR REPRODUCING SURFACE TEXTURE AND METHOD FOR MAKING THE SAME

CROSS REFERENCE TO RELATED APPLICATION

This is a divisional application of parent application Ser. No. 117,706, filed Feb. 22, 1971, now abandoned and entitled MOLD FOR REPRODUCING SURFACE TEXTURE AND METHOD FOR MAKING THE SAME, which in turn was a continuation of application Ser. No. 782,189, filed Dec. 9, 1968 and now abandoned.

This invention relates to synthetic resin molds and to a method of making the same.

Synthetic resin molds have been used to make reproductions of articles on a low volume, low cost basis. Most synthetic molds are produced for low pressure molding operations.

The synthetic molds can be made from silicone rubber, epoxy resins and polyesters. The molds made from these materials generally are quite suitable for small parts. Larger molds, especially when made from polyesters, are known to be dimensionally unstable as a result of inherent shrinkage of the mold material during curing. The shrinkage results in not only an inaccurate reproduction but also causes distortion of the mold due to differential curing of the mold.

I have now discovered an improved mold and a process for producing the same wherein the mold is formed of a curable resin in two parts with an intermediate spacer layer therebetween. The two parts are separated for curing of the larger part and then reunited after the removal of the intermediate spacer layer.

By various aspects of this invention, one or more of the following, or other, objects can be obtained.

It is an object of this invention to provide a dimensionally stable, cured resin mold for large and small parts.

It is another object of this invention to provide a method of making a cured resin mold wherein the deleterious effects of shrinkage during curing are eliminated.

It is a further object of this invention to provide a method of forming a dimensionally stable polyester resin mold for large and small parts having high surface reproduction fidelity.

It is still another object of this invention to provide a method for forming a dimensionally stable resin mold for reproducing wood and other natural material surface textures.

Other aspects, objects, and the several advantages of this invention are apparent to one skilled in the art from a study of this disclosure, the drawings, and the appended claims.

According to the invention, there is provided a mold for forming parts from synthetic resins wherein the parts have high surface reproduction fidelity and excellent dimensional accuracy. The mold is formed of a thin skin having an inner surface forming a mold cavity. The skin is formed from first and second uniform thickness layers of resin material. The first layer has a thickness less than 0.05 inch and comprises a cured resin having uniformly dispersed therein heat conducting metal powders. The second layer has a thickness in the range of one-sixteenth to one-fourth inch and comprises a cured resin having uniformly dispersed therein heat conducting metal powders and reinforcing fibers.

A reinforcing base forms the second part of the mold. The reinforcing base is massive relative to the first and second layers forming the thin skin and is formed from a fiber reinforced cured resin. The reinforcing base is secured to the thin skin.

Further, according to the invention, there is provided a method for making a mold for the reproduction of a solid pattern wherein the reproduced articles have high surface fidelity. The method comprises forming around the pattern a thin skin of at least one relatively thin and uniform layer of a cured resin material, the thin skin forming a negative shape and surface of the pattern. A temporary separator layer is formed around the outside surface of the thin skin and is separable therefrom. A reinforcing base of a partially cured synthetic resin is formed on the outer surface of the temporary spacer layer. The reinforcing base is removed in a partially cured condition from the temporary spacer layer and cured to a rigid self-supporting mass separate from the thin skin. The separator layer is removed from the thin skin. The cured reinforcing base is then reunited with the thin skin to form a dimensionally stable, high surface fidelity reproduction mold.

The invention will now be described with reference to the accompanying drawings in which.

Figure 1:
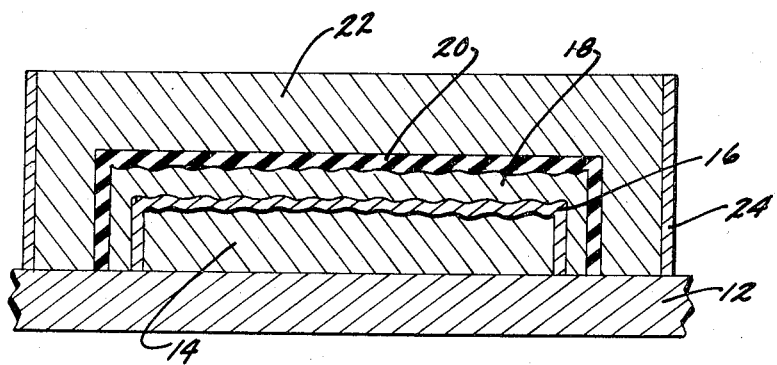
FIG. 1 is a cross-sectional view through a mold illustrating the first phase of the mold forming process.

Referring now to FIG. 1, a pattern 14 is placed on a base 12. The pattern is the article such as a wood part which is to be reproduced. A first resin layer 16 is formed on the pattern by depositing a uniform layer of a curable resin material such as a polyester resin on the pattern. The material is then cured under conventional curing conditions. The first uniform layer 16 is less than 0.05 inch and preferably about 0.02 inch thick and comprises a polyester resin-metal powder mixture. The first layer 16 in the drawing has been enlarged for illustration purposes. It will be obvious that the layer 16 in actual practice will be much thinner than that which appears in the drawing.

A second layer 18 is then formed on top of layer 16 to reinforce the same. The second layer 18 is preferably formed from a polyester-metal powder-fiber mixture and is uniformly deposited in an uncured state on the outside of the first layer 16. The second layer 18 is then cured to a rigid body.

The second layer 18 has been illustrated as relatively thick but in actual practice will be in the nature of one-sixteenth to one-fourth inch in thickness.

The first layer 16 and the second layer 18 are thin enough to be uniformly spread over the pattern. The uniform thin layers thus will be cured evenly so as to avoid differential shrinkage during the curing operation. Differential shrinkage causes unbalanced stresses in the mold and distortion of the mold pattern.

An intermediate spacer layer 20 is then formed on the outer surface of the second layer 18. The spacer layer is preferably formed of an elastomeric material such as room temperature vulcanizable silicone rubber. If desired, a parting agent can be used on the outer surface of the second layer 18 to assure later separation of the intermediate spacer layer 20 from the second layer 18. The intermediate spacer layer 20 has been shown as relatively thick for illustration purposes but in actual practice is about one-sixteenth to one-fourth inch with about one-eighth inch thickness preferred.

Side walls 24 are then built on the base 12 to form a dam for the reinforcing base mixture to be applied thereafter. Again, if desirable, a parting agent can be applied to the outer surface of the intermediate spacer layer 20 to assure separation of the spacer layer 20 from the reinforcing base 22.

The reinforcing base 22 is then poured as a curable liquid resin mixture into the area bounded by the side walls 24. The reinforcing base 22 is then partially cured to a self-supporting mass.

Figure 2:
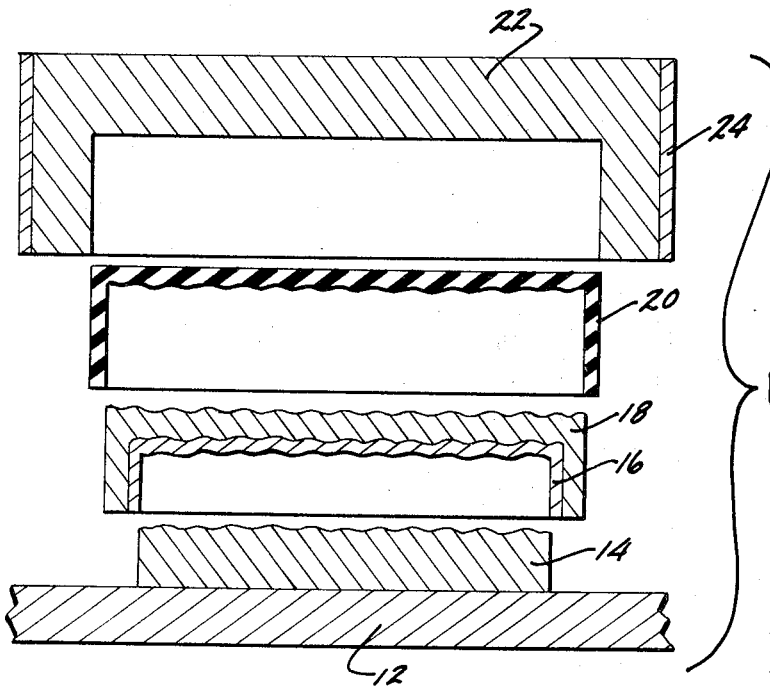
FIG. 2 is a sectional view of the mold in FIG. 1 illustrating a second phase of the mold making process.
Figure 3:
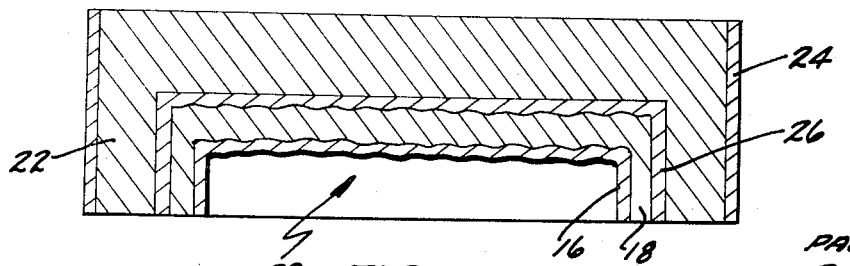
FIG. 3 is a view similar to FIGS. 1 and 2 illustrating the final completed mold.

As illustrated in FIG. 2, the reinforcing base 22 containing side walls 24 is then separated from the intermediate spacer layer 20 which is in turn separated from the thin mold cavity forming skin of layers 16 and 18.

The reinforcing base 22 is then given a final cure to produce a rigid solid mass. During the cure, the base 22 can be braced to prevent distortion. After the cure of the reinforcing base 22, it is reunited with the mold cavity forming skin through an adhesive layer 26. The inner surface of the first layer 16 forms a mold cavity for the molding of synthetic resin products which resemble the pattern 14. The first layer thereby forms a memory layer which enters all depression type variations of the pattern surface texture.

If desirable, prior to applying the first uniform layer on the pattern, various preparatory steps can be taken. For example, with a wood pattern, the surface can be coated with a wax which is then brushed out to re-establish the wood grain pattern. A polyvinyl alcohol film can then be coated on the surface as a parting agent.

The first layer 16 is preferably a polyester-metal powder composition which is uniformly applied to the surface as a thin liquid having high fluidity sufficient to accurately reproduce very fine surface textures such as wood grain. For this purpose, I have found that a polyester such as an isophthalic polyester resin mixed with about 40 weight parts of filler and 25 to 50 weight parts of metal powders per 100 weight parts of polyester is suitable. When the mixing takes place at high shear rates, as described in my copending application Ser. No. 782,188, filed Dec. 9, 1968, (Konel P-300) the filler and metal particles are uniformly dispersed within the polyester resin and a low viscosity mixture is produced. After mixing the metal particles and filler into the polyester, styrene or other suitable vinylidene-containing monomers and a catalyst are added to the mixture. Promoters can also be blended into the polyester resin to initiate a room temperature cure. Otherwise, the resin can be cured at an elevated temperature. Suitable promoters and catalysts are conventional and well known and are set forth in said co-pending application.

The second layer 18 is a reinforcing layer for the first layer and is preferably formed of a similar polyester composition except that there is added thereto reinforcing fibers such as glass fibers. The reinforcing fibers comprise generally about 10 to 30 weight parts per 100 weight parts of polyester resin and preferably about 20 weight parts per 100 weight parts of polyester resin. These fibers preferably have a length of one-eighth to one-fourth inch and are blended with the polyesters after addition of the styrene and catalyst. The reinforcing fibers are blended into the polyester resin composition in a manner such as to retain the integrity of the fiber strand structure as described in said co-pending application.

A preferred composition for the second layer contains a smaller percentage of metal powders than the first layer. Preferably, 10 to 15 weight parts of metal powder per 100 parts of polyester resin are present in the second layer. Further, the second layer contains about 40 to 50 weight parts of a filler per 100 weight parts of polyester resin.

The metal powders utilized in the first and second layers improve the heat conducting capacity of the mold pattern skin. This added heat conducting capacity aids in the high fidelity surface reproduction of the parts formed in the finished mold. Suitable powders will be about 300 mesh.

The reinforcing base can be formed of any suitable synthetic resin material. Preferably, the reinforcing base is formed of a polyester of the same general composition as the first layer 16 and the second layer 18 which together form the thin skin. The polyester preferably is an isophthalic polyester made in accordance with the procedure of said co-pending application, Ser. No. Ser. No. 134,443, filed May 15, 1971. Such polyesters comprise 100 weight parts of a polyester such as an isophthalic polyester resin, about 40 to 150 weight parts of a filler such as calcium carbonate, and 1 weight part of catalyst and about 30 to 40 weight parts of fibrous reinforcing materials mixed in accordance with the process set forth in said co-pending application. In the process of mixing, about 12 to 20 parts of styrene are added to the polyester mixture. Other polyester compositions formed by other methods can also be employed according to the invention.

The intermediate spacer layer is preferably an elastomeric layer so that the base shrinkage occurring prior to separation of the base from the skin will minimize the stress on the thin skin. The elastomeric spacer layer will yield with movement the areas of the reinforcing base and will not transfer the stress to the thin mold forming skin. Preferably, the spacer layer is formed from a room temperature vulcanizable silicone rubber which is uniformly coated on the skin as a liquid and then vulcanized in place at room temperature.

The cure for the reinforcing base can be according to conventional methods. The curing time and temperature will depend on the catalyst and promoters employed in the base mixture. With many polyester compositions room temperature cures are possible and preferred.

The adhesive layer 26 is preferably a polyester of the same nature as the skin and the reinforcing base except that no fibrous reinforcing material need be present in the adhesive layer.

The use of thin coatings forming the skin of the mold avoids differential shrinkage when both the first and second layers are curing.

The curing of the reinforcing base separately from the mold forming skin permits the base to shrink as required without imparting stresses to the mold skin. Further, the spacer layer 20 provides a shrinkage tolerance for the reinforcing base.

It has been found that with the use of the invention molds can be made to produce a dimensional accuracy and stability of one-eighth inch in 6 feet.

EXAMPLE

A mold was made around a wood piece from the following compostions:

LAYER 16

| Compounds | Parts By Weight |
|---|---|
| Isophthalic polyester resin [1] | 100 |
| Calcium carbonate filler | 40 |
| Coarse brass powder | 35 |
| Styrene | 15 |
| Cobalt napthanate | 1 |
| Methyl ethyl ketone peroxide | 1 |
| LAYER 18 | |
| Isophthalic polyester resin [1] | 100 |
| Calcium carbonate | 40 |
| Coarse brass powder | 15 |
| Glass strands (1/8" long) | 20 |
| Styrene | 15 |
| Cobalt napthanate | 1 |
| Methyl ethyl ketone peroxide | 1 |
| LAYER 20 | |
| Room temperature vulcanizable silicone rubber | |
| BASE 22 | |
| Isophthalic polyester resin [1] | 100 |
| Calcium carbonate | 100 |
| Styrene | 15 |
| Glass strands (1/8" long) | 20 |
| Cobalt napthanate | 1 |
| Methyl ethyl ketone peroxide | 1 |
| LAYER 26 | |
| Same as base 22 without glass strands | |

[1] 65 parts isophthalic polyester and 35 parts styrene (by weight)

The layer 16 was applied to the pattern and allowed to cure at room temperature for 12–48 hours. The layer 18 was then applied and allowed to cure for 12–48 hours. The layer 20 was applied and cured at room temperature overnight.

The base 22 was poured into the dam on top of layer 20 and allowed to set to a relatively soft, self-supporting solid shape. It was separated from the layer 20 and cured independently of the layers 16 and 18 at an elevated temperature for about 2–3 hours. The base set up to a rigid hard mass. When cool, the base 22 was cemented to the layer 18 with layer 26. The mold was then cured at room temperature within 48 hours.

Reasonable variation and modification are possible within the scope of the foregoing disclosure, the drawings, and the appended claims without departing from the spirit of the invention.

The embodiments of an invention in which an exclusive property or privilege is claimed are defined as follows:

1. A method for making a mold for the reproduction of a surface pattern wherein the reproduced articles have a high surface fidelity, said method comprising:

forming around said pattern a mold skin formed from a first uniform in thickness layer of a polyester resin material having uniformly dispersed therein heat conducting metal powder, said first layer being less than about 0.05 inches thick, and a second layer having a thickness in the range of one-sixteenth to one-fourth inch and formed of a cured polyester resin having uniformly dispersed therein metal powders and reinforcing fibers, said layers being formed as a negative shape and surface of said pattern, and wherein said layers are cured while positioned on said pattern;

forming a spacer layer around the outside surface of said mold skin, said spacer layer being separable from said mold outside surface;

forming a reinforcing base on the outside surface of said spacer layer so that said spacer layer is separable from said base, said base being formed from a partially cured resin material so that said reinforcing base is a self-supporting structure;

separating said reinforcing base, said spacer layer, and said mold skin;

curing said reinforcing base to a rigid self-supporting solid mass; and reuniting said mold skin and said reinforcing base with an adhesive therebetween whereby distortion of said mold skin and said reinforcing base during cure of said reinforcing base is avoided.

2. The method according to claim 1 wherein said reinforcing base is a polyester resin having dispersed therein reinforcing fibers.

3. The method according to claim 1 wherein said base is joined to said mold skin with a curable polyester resin, and said curable polyester resin between said reinforcing base and said mold skin is cured when said base and mold skin are brought together to adhesively secure said mold skin to said reinforcing base.

* * * * *